United States Patent [19]
Lucas

[11] Patent Number: 5,892,293
[45] Date of Patent: Apr. 6, 1999

[54] RMS ENERGY CONVERSION

[75] Inventor: Timothy S. Lucas, Richmond, Va.

[73] Assignee: Macrosonix Corporation, Richmond, Va.

[21] Appl. No.: 783,701

[22] Filed: Jan. 15, 1997

[51] Int. Cl.$^6$ ................................................. H02P 9/04
[52] U.S. Cl. ........................... 290/1 R; 431/1; 60/39.76
[58] Field of Search .................................. 290/1 R, 1 A, 290/2; 322/3; 431/1; 60/39.76; 62/498

[56] References Cited

U.S. PATENT DOCUMENTS

| | | |
|---|---|---|
| 1,329,559 | 2/1920 | Tesla . |
| 4,599,551 | 7/1986 | Wheatley et al. ...................... 322/2 R |
| 4,685,510 | 8/1987 | Priem et al. .............................. 165/62 |
| 4,752,209 | 6/1988 | Vishwanath et al. ...................... 431/1 |
| 4,762,487 | 8/1988 | Zappa .......................................... 431/1 |
| 5,263,341 | 11/1993 | Lucas ....................................... 62/498 |
| 5,515,684 | 5/1996 | Lucas et al. .................................. 62/6 |
| 5,659,173 | 8/1997 | Putterman et al. ................. 250/361 C |

OTHER PUBLICATIONS

Swift, "Termoacoustic Engins", Journal Acoust. Soc. Am., vol. 84, No. 4, (1988) pp. 1145–1180.
Putnam et al., "Pulse Combustion", Prog. Energy Combust. Sci., vol. 12, (1986) pp. 43–79.
Vishwanath, "Advancement of Developmental Technology for Pulse Combustion Applications", Gas Research Institute Report No. GRI–85/0280 (1985).
Griffiths et al., "The Design of Pulse Combustion Burners", Research Bulletin, No. 107, (1969).

*Primary Examiner*—Thomas M. Dougherty
*Assistant Examiner*—Nicholas Ponomarenko
*Attorney, Agent, or Firm*—Foley & Lardner

[57] ABSTRACT

An energy conversion device comprises an acoustic resonator, a pulse combustion device for creating a standing wave within said resonator, and an electric alternator. The alternator is coupled to the resonator to convert acoustically driven mechanical vibrations into electrical power.

29 Claims, 7 Drawing Sheets

RMS ENERGY CONVERSION

BACKGROUND OF THE INVENTION

1) Field of Invention

This invention relates to Resonant Macrosonic Synthesis (RMS) resonators which are either pulse combustion driven or thermo acoustically driven for the purpose of energy conversion, having specific applications to electric power production.

2) Description of Related Art

History reveals a rich variety of technologies conceived for the purpose of electric power production. Of particular interest are those technologies designed to combust liquid or gaseous fuels in order to produce electric power.

Many types of internal combustion engines have been employed which convert the chemical potential energy of fuels into mechanical energy which is used to drive an electric alternator. However, internal combustion engines need frequent periodic maintenance and provide low conversion efficiencies. Currently, turbines provide the most efficient conversion of fuels, such as natural gas, into electric power. The design and manufacturing sophistication which is inherent in turbine technology can be seen in both their initial cost and operating cost.

Some effort has been directed to the field of standing acoustic waves as a means of electric power production. For example, it was suggested by Swift that the oscillating pressure of thermoacoustically driven standing waves could be utilized for driving an alternator to produce electric power (G. W. Swift, "Thermoacoustic Engines," *J. Acoust. Soc. Am.* 84, 1166 (1988)). This would be accomplished by coupling a piston to an open end of the acoustic resonator and allowing the vibrating piston to drive a linear alternator. The piston would require a gas seal such as a diaphragm or bellows which raises issues of reliability. Moving pistons also limit the dynamic force which can be extracted from the standing wave, thereby limiting the thermoacoustic generator's efficiency.

Another application of standing acoustic waves to the production of electric power was reported by Swift which exploited Magneto Hydrodynamic effects in a thermoacoustically driven liquid sodium standing wave engine (G. W. Swift, "Thermoacoustic Engines," *J. Acoust. Soc. Am.* 84, 1169 (1988)).

Pulse combustion (PC) is a further field of research where electric power production has been proposed in connection with standing acoustic waves. Other than Magneto Hydrodynamics the PC field has apparently received little attention as a means of producing electric power. Considerable research and development has occurred in the PC field dating back to the previous century. In the early 1920s pulse combustors first received attention as a means to drive electric power producing turbines as seen in U.S. Pat. No. 1,329,559 to Nikola Tesla. Most of the applications research performed today relates to producing either heat or propulsive thrust. For these applications, pulse combustors have always been comparatively attractive, due to their self-sustaining combustion cycle, inherent simplicity, and low production of pollutants. Putnam, Belles, and Kentfield provide a comprehensive history of pulse combustor development showing many of the embodiments and applications in the art of pulse combustion (A. A. Putnam, F. E. Belles, and J. A. C. Kentfield, "Pulse Combustion," Prog. Energy Combust. Sci. 12, 43–79 (1986)). The field of PC research is very active with significant efforts taking place at institutions such as the Gas Research Institute, Sandia Combustion Labs, and various universities.

In summary, thermoacoustic engines have been proposed as a means of driving piston-actuated electric alternators to produce electric power. However, the concept is in need of certain optimizations, practical improvements, and simplifications. Little effort has been directed toward developing a practical system for utilizing PC-driven standing waves as a means of electric power production. When compared to contemporary technologies, such as gas turbines, a PC electric power generator would provide a fuel-to-electric conversion system of extraordinary simplicity.

SUMMARY OF THE INVENTION

It is an object of the present invention to provide pulse combustion (PC) driven acoustic resonators whose vibratory motion is used to drive an electric alternator.

A further object of the present invention is to employ resonant macrosonic synthesis (RMS) resonators as a PC chamber in order to maximize the acoustic reaction force for a given fuel consumption rate, thereby improving fuel-to-electric transduction efficiency.

A still further object of the present invention is to increase the power density of a PC by providing tuned induction as well as pre-heating and premixing of the combustion reactants.

An even further object of the present invention is to provide a comparatively inexpensive technology for converting fuels such as natural gas into electric power.

An additional object of the present invention is to provide needed optimizations and practical improvements to thermoacoustic electric power generators.

These and other objects and advantages of the invention will become apparent from the accompanying specifications and drawings, wherein like reference numerals refer to like parts throughout.

DETAILED DESCRIPTION OF DRAWINGS

DETAILED DESCRIPTION OF THE PREFERRED EMBODIMENTS

Acoustically driven structural vibration of the combustion chamber (the resonator) is typically an unwanted byproduct of PC operation. Considerable research is directed toward minimizing this unwanted effect. In contrast, the present invention exploits these vibrations as a means of creating electric power by allowing the entire resonator to be driven back and forth in response to the standing wave's dynamic pressure.

Figure 1:
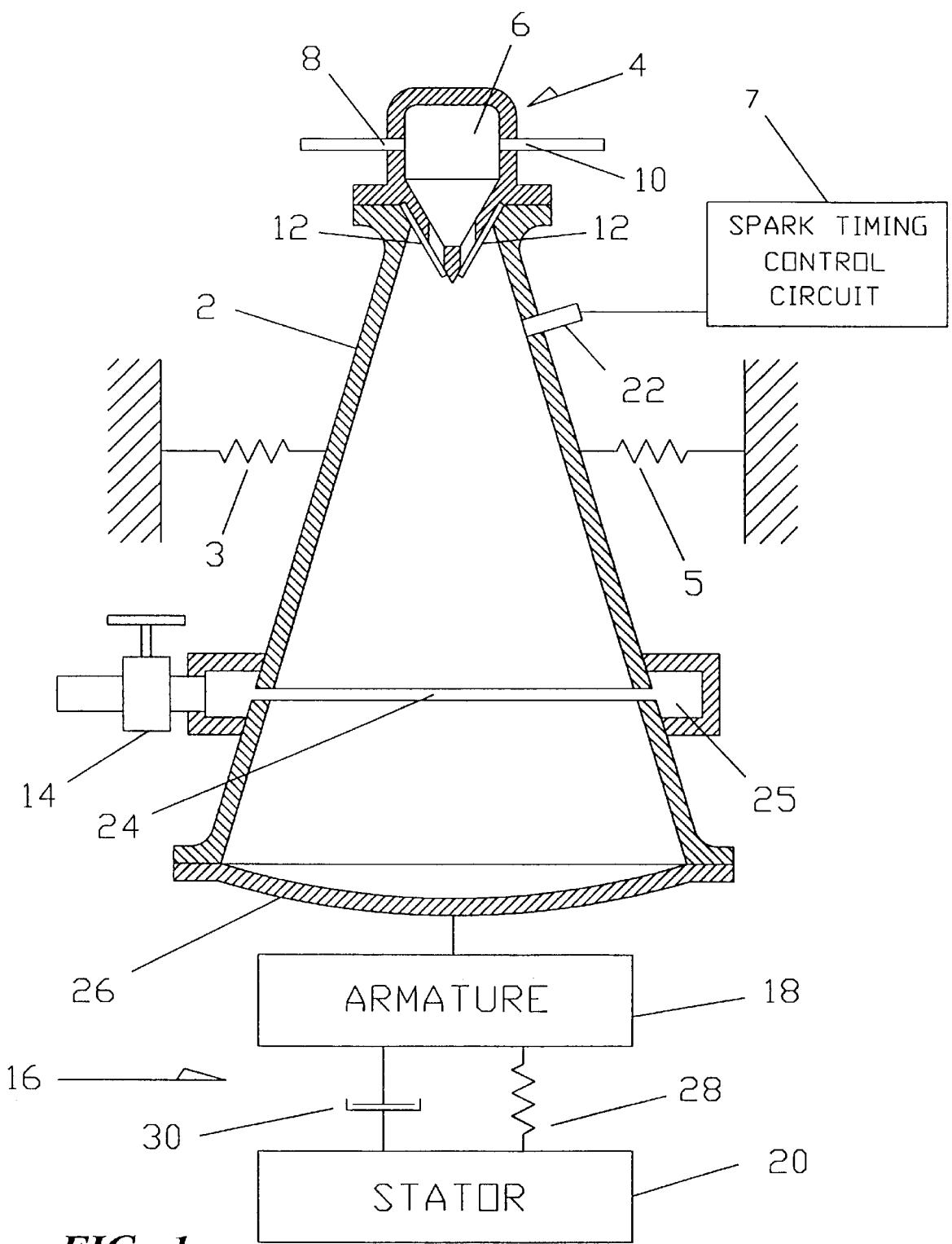
FIG. 1 is a sectional view of a pulse combustion electric power generator in accordance with the present invention.

FIG. 1 shows an embodiment of the present invention where a RMS resonator 2 is provided, which is resiliently mounted to the stationary surrounding environment by springs 3 and 5 thereby being unrestrained and free to vibrate along its cylindrical axis z. Resonator 2 has a rigid end wall 26, an annular exhaust port 24, annular exhaust plenum 25, optional throttle valve 14, spark plug 22, and a valve head 4. Valve head 4 comprises a fuel-oxidizer plenum 6, a fuel inlet 8, an oxidizer inlet 10 and reactant inlet valves 12.

Connected to resonator 2 is alternator 16 comprising armature 18 which is rigidly connected to resonator 2 and stator 20 which is resiliently connected to armature 18. The resilient connection is shown schematically as spring 28 and damper 30. The term stator is not used here to imply that stator 20 is stationary. On the contrary, stator 20 can be unrestrained and free to vibrate or alternatively it can be rigidly restrained. Optionally, armature 18 could be spring mounted to resonator 2 in order to provide further control of the relative vibrational phases of stator 20, armature 18, and resonator 2.

Many methods exist for starting pulse combustors and spark plug 22 provides one such approach. In operation, spark plug 22 creates a spark which initiates the combustion of the fuel-oxidizer mixture inside resonator 2. This initial combustion starts the well known self-sustaining PC cycle which is driven by the resultant oscillating pressure inside resonator 2. Once started, the spark plug can be deactivated and the PC system will run at its characteristic resonant frequency.

Other methods can be used to vary the resonant frequency such as a spark timing control circuit 7 in FIG. 1 and rotary valves both of which are per say well known. Variably-tuned resonator branches could also be used to vary the resonant frequency. For example, a variably tuned branch could comprise a narrow cylindrical tube having one end which opens into the combustion resonator and the other end fitted with a tuning piston. The resonant frequency of the combustion chamber could be varied by sliding the tuning piston within the tube.

Figure 2:
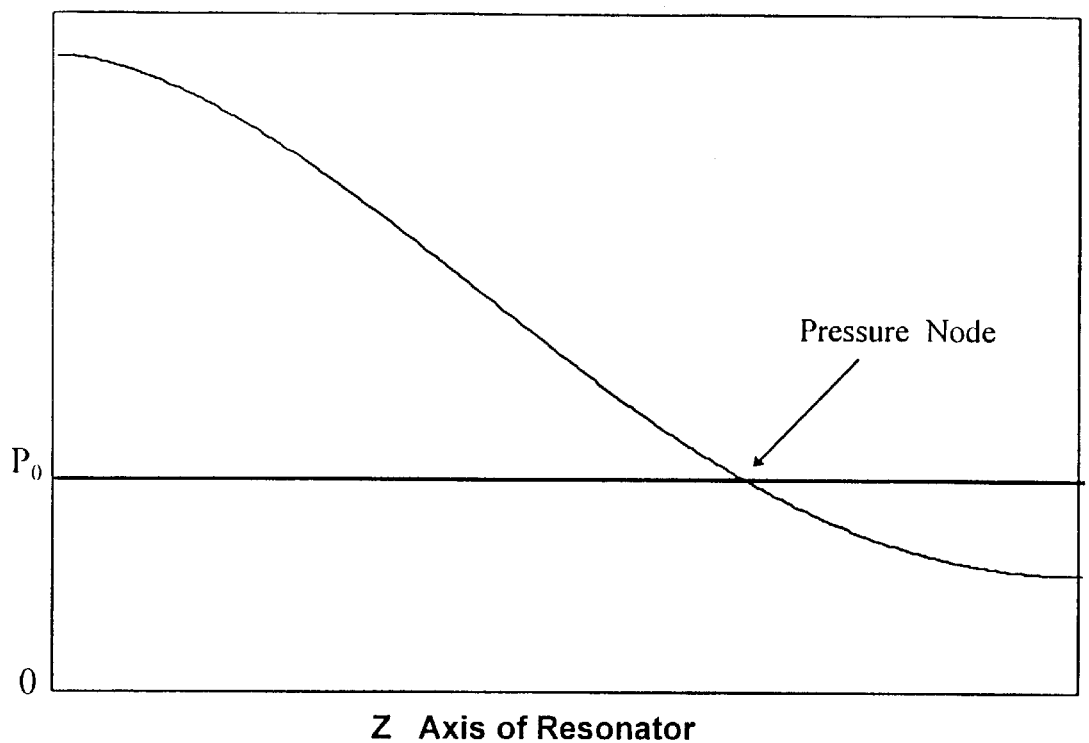
FIG. 2 is a graphical representation of the fundamental mode's peak pressure distribution corresponding to resonator 2 of FIG. 1.

Combustion products exit resonator 2 through annular port 24 which must have sufficient flow area to support the design exhaust flow rate. FIG. 2 illustrates the fundamental mode's peak pressure distribution along the length of resonator 2, where z is its axi-symmetric axis for which z=0 at the narrow end and z=L at the wide end. Although port 24 can be placed anywhere within the walls of resonator 2, the preferred placement corresponds to the fundamental's pressure node shown in FIG. 2 which will tend to minimize the transmission of dynamic pressure through port 24. If dynamic pressure is transmitted through port 24, then it can no longer be converted into useable force as described below. In general, exhaust port placement should be chosen so as to maximize the resonator's internal dynamic pressure. Port 24 could be fitted with optional throttle valve 14 or could be equipped with compressor-type discharge valves such as reed valves or plate valves which would open in response to the pressure difference across the valve.

Once the standing wave is established its oscillating pressure exerts dynamic forces against the inner walls of resonator 2 causing it to vibrate as a rigid body along the z direction at the acoustic frequency. Armature 18 is attached to resonator 2 and so is set into vibration with it. The resulting relative motion of armature 18 and stator 20 will create electric power in a manner determined by the generator's topology. In the preferred embodiment, stator 20 is not stationary but free to move at some phase angle with respect to the motion of armature 18. Alternator 16 could be a voice coil alternator, a variable reluctance alternator as shown in U.S. Pat. No. 5,174,130 the entire contents of which are hereby incorporated by reference, an alternator as shown in U.S. Pat. No. 5,389,844 the entire contents of which are hereby incorporated by reference, or any other of a great number of linear alternators. Other designs that could be employed, but which lack a literal armature and stator, include piezoelectric and magnetostrictive alternators. Alternator selection will reflect the specific design requirements including frequency of operation, the resonator's vibrational displacement amplitude, and transduction efficiency between mechanical and electrical power.

The characteristics of the resilient mounting, shown schematically as spring 28 and damper 30, between armature 18 and stator 20 will affect the transduction efficiency of the system. Optimal power factors can be found by modeling the system dynamics and accounting for all the moving masses, springs and damping in the system. The specific analytical model will reflect the type of alternator employed by the system.

The resistance presented to the exhaust flow by port 24, plenum 25 and optional throttle valve 14 will influence the average pressure $P_0$ upon which the dynamic pressure is superimposed as shown in FIG. 2. Other factors influencing the average pressure $P_0$ will include the inlet flow resistances, the fluid properties, and the resonator geometry. Throttle valve 14 can be used to adjust the exhaust flow resistance and thus vary the average pressure $P_0$. Increasing the outlet flow resistance will increase $P_0$ and decreasing the outlet flow resistance will reduce $P_0$. For a given power input, increasing $P_0$ will generally increase the peak-to-peak dynamic pressure, thereby increasing the dynamic forces on the resonator, resulting in increased electric power output. Thus, in order to maximize fuel-to-electric transduction efficiency the average pressure $P_0$ should be as high as possible as long as the negative peak pressure $-P$ does not rise above the reactant supply pressure which would interrupt the intake of fresh reactants. If discharge valves are used in combination with port 24, then both the flow area of the valve system and the valve's spring loading, if any, will influence $P_0$. Alternatively, compressor-type dynamic discharge valves could be located at z=0 where discharge pressures are higher resulting in reduced exhaust volume flow rates.

Preferred embodiments of the present invention use the resonator's first longitudinal mode as illustrated by FIGS. 1 and 2 in order to maximize the reaction forces and thus the fuel-to-electric transduction efficiency as described. Alternatively, rigid wall 26 could be resiliently attached to resonator 2 with a flexible seal, such as a bellows, which would allow wall 26 to vibrate independently of resonator 2. Resonator 2 could be rigidly restrained while allowing wall 26 to vibrate along the z axis in response to the dynamic acoustic pressure, thereby driving armature 18 of alternator 16. Also, Helmholtz type resonators could be used within the scope of the present invention with an alternator also being connected to the resonator as in FIGS. 1 and 4.

Resonator design plays an important role in optimization of the present invention. The particular resonator design chosen will determine the dynamic pressure amplitude which can be achieved for a given acoustic power input and thus plays an important role in determining the fuel-to-electric transduction efficiency of the present invention. RMS resonators for obtaining unshocked ultrahigh dynamic pressures with specific predetermined waveforms are described in U.S. Pat. Nos. 5,515,684 and 5,319,938 and their divisional and continuing applications, the entire contents of which are hereby incorporated by reference.

Figure 3:
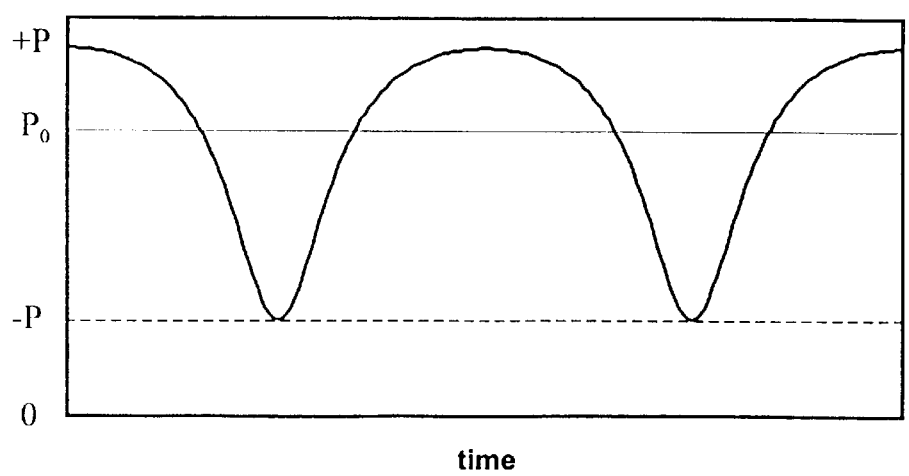
FIG. 3 is a graphical representation of a pressure-time waveform which can be provided by RMS resonators having certain advantages for the present invention.

In addition to providing ultrahigh dynamic pressures, RMS resonators offer other advantages derived from waveform synthesis. For example, FIG. 3 shows an RMS resonator waveform that provides $|-P|>|+P|$, where $|-P|\equiv P_0+(-P)$ and $|+P|\equiv (+P)-P_0$. This waveform will allow the pulse combustor to run at a higher average pressure $P_0$ while still keeping the negative peak pressure $-P$ below the reactant supply pressure so that the reactant flow is not interrupted. As explained, running higher $P_0$ values improves the fuel-to-electric energy transduction efficiency. To those skilled in the art, RMS resonators will provide numerous enhancements to the present invention all of which are considered to be within the scope of the present invention.

Another consideration for maximizing $P_0$ is the placement of inlet valves 12 in FIG. 1. The small diameter end of resonator 2 will provide the largest dynamic pressures and thus the lowest negative peak pressure $-P$ for a given value of $P_0$. Consequently, this valve placement allows the PC to operate at the highest $P_0$ value with all of the advantages cited above. Optionally, the valves could be placed at any other location within the walls of the resonator where the dynamic pressure of the fundamental exists.

Figure 4:
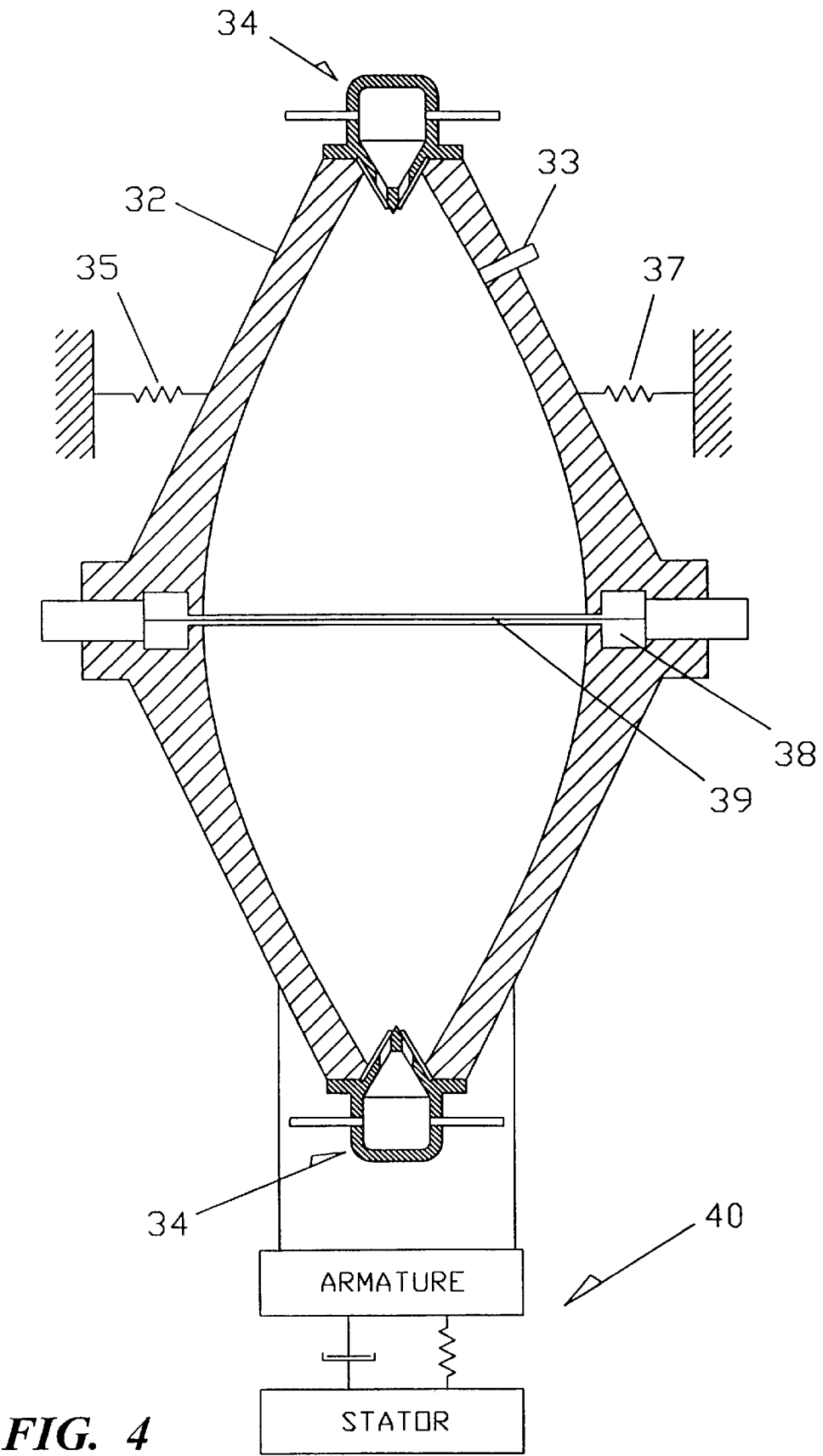
FIG. 4 is a sectional view of a pulse combustion electric power generator in accordance with the present invention having a resonator geometry which increases the acoustically-driven dynamic forces on the resonator.

FIG. 4 illustrates an embodiment of the present invention employing a RMS resonator 32 whose longitudinal symmetry increases the acoustic forces on the resonator created by the fundamental mode's pressure distribution. The curvature of resonator 32 is determined by $D(z)=D_{th}+k[\sin(\pi z/L)]$, where D is the diameter, $D_{th}$ is the throat or starting diameter, z is the axi-symmetric axis of resonator 32, k is a weighting coefficient and L is the resonator's total axial length. Alternatively, the curvature of resonator 32 could be described by any number of other functions including hyperbolic, parabolic or elliptical all of which will give different force characteristics.

Resonator 32 is resiliently mounted to the stationary surrounding environment by springs 35 and 37 thereby being unrestrained and free to vibrate along its cylindrical axis z. Mounted to each end of resonator 32 are identical valve heads 34 which allow 2 combustion events per acoustic cycle thereby increasing the PC generator's power density. Alternatively, the pulse combustor of FIG. 4 can run with only one valve head at the cost of reduced power density. Resonator 32 has an annular exhaust port 39 and annular exhaust plenum 38 whose functions are identical to annular exhaust port 24 and annular exhaust plenum 25 of FIG. 1. A generator 40 is shown schematically which converts the z axis vibration of resonator 32 into electric power as described above in relation to FIG. 1.

Figure 5:
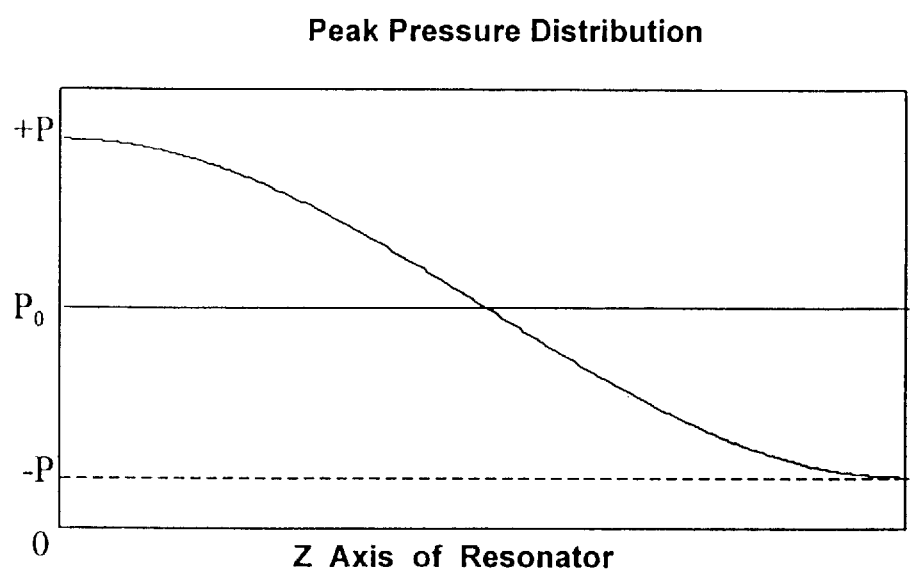
FIG. 5 is a graphical representation of the fundamental mode's peak pressure distribution corresponding to resonator 32 of FIG. 4.

FIG. 5 shows the peak pressure distribution of the fundamental mode along the length of resonator 32, where z is its axi-symmetric axis and $+P$ is the positive peak pressure and $-P$ is the negative peak pressure. For the fundamental mode, the local z components of the inner surface area are directed so that all the local products of pressure and area at any time will produce forces on the resonator walls having the same z axis direction. This condition will hold as long as dr/dz changes mathematical sign wherever the peak pressure distribution changes mathematical sign. For resonator 32 this condition occurs at $z=L/2$, where L is the resonator length. In addition to $z=L/2$, there is a continuum of z values at which both dr/dz and the peak pressure distribution can be made to change sign together.

The relative dimensions of resonator 32 can be adjusted to further increase the acoustically exerted forces by changing the maximum-to-minimum diameter ratio. For resonator 32, the maximum diameter occurs at $z=L/2$, and the minimum diameter occurs at $z=0$ and $z=L$, where the diameter=$D_{th}$. For example, if the max/min diameter ratio of resonator 32 begins at 1.7 and is increased a factor of 7, then the force increases by a factor of 40. This assumes that the peak-to-peak dynamic pressure, as measured at $D_{th}$, remains the same for both cases.

Under some circumstances air, or a given oxidizer, must first be forced under pressure into the resonator before the reactants can be ignited. This same starting method will work with the present invention.

Another starting scheme for the present invention is to use the alternator as a starting motor so that the PC generator is temporarily operated as an acoustic compressor. In start mode, an alternating voltage is applied to the motor which then drives the resonator back and forth thereby exciting its fundamental resonant mode. The valves respond to this mechanically-driven dynamic pressure and reactants are drawn into the combustion chamber at which time an applied spark can initiate the PC cycle. To avoid abruptly switching from motor to alternator mode, the motor could be switched off just prior to the firing the ignition spark. Once the PC cycle is started the motor is switched back to alternator mode, and electric power is provided as described above.

Figure 6:
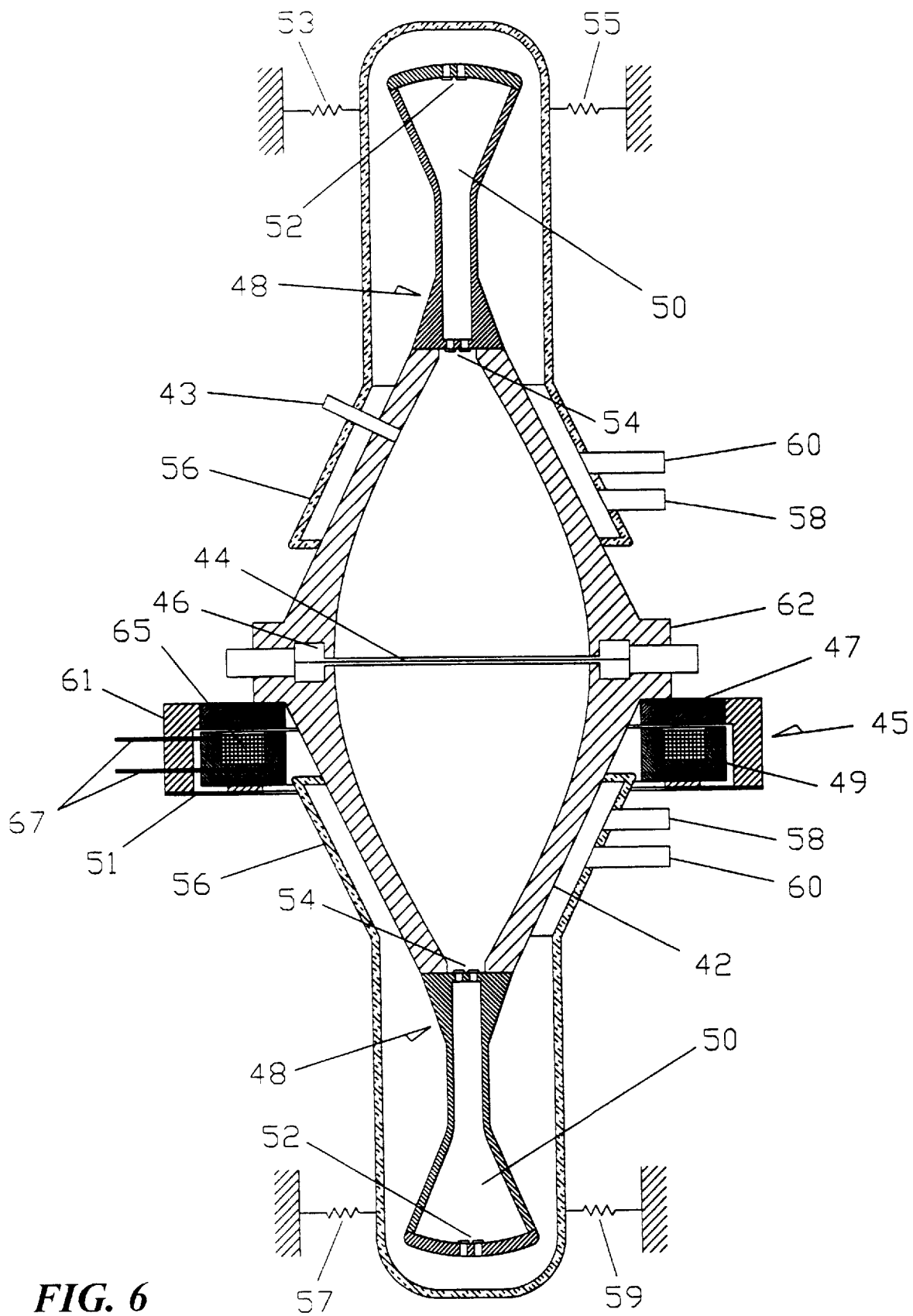
FIG. 6 is a sectional view of a pulse combustion electric power generator in accordance with the present invention having tuned induction compressors and reactant pre-combustion mixing.

As explained, large $P_0$ values increase the PC generator's efficiency and power density. FIG. 6 illustrates another embodiment of the present invention which provides even higher $P_0$ values by means of tuned induction compressors for induction ramming. The embodiment of FIG. 6 also provides reactant preheating and thorough premixing. These features promote high efficiency due to complete burning of reactants as well as rapid burn rates for high frequency operation.

In FIG. 6 a resonator 42 is provided whose internal geometry is similar in form and function to resonator 32 of FIG. 4. Resonator 42 is resiliently mounted to the stationary surrounding environment by springs 53, 55, 57, and 59 thereby being unrestrained and free to vibrate along its cylindrical axis z. Resonator 42 has spark plug 43, annular exhaust port 44 and annular exhaust plenum 46 whose functions are identical to annular exhaust port 39 and annular exhaust plenum 38 of FIG. 4. Mounted to each end of resonator 42 are identical acoustic induction compressors 48 consisting of tuned plenums 50, first stage valves 52 and second stage valves 54. Plenums 50 are designed so as to have approximately the same resonance frequency as resonator 42. Identical heat exchanger cowlings 56 are provided with fuel inlets 58 and oxidizer inlets 60. Cowlings 56 need not be rigidly attached to resonator 42 but must at least form a seal with resonator 42 to prevent reactant leakage. If cowlings 56 were resiliently mounted so that they need not vibrate with resonator 42, then they could provide both heat insulation and noise suppression. Also, a single inlet could be provided in each cowling for fuel and oxidizer rather than the two respective openings shown.

Many alternator topologies can be annularly configured so as to wrap around resonator 42. For example, FIG. 6 shows a variable reluctance alternator 45 which is wrapped annularly around resonator 42. Alternator 45 has annular armature 47 which is rigidly connected to flange 62 of resonator 42, annular stator 49 which is resiliently connected to armature 47 via annular spring 51 and annular linkage 61, drive coil 65 within annular stator 49, and drive coil leads 67. Dynamically, alternator 45 will respond to the z axis vibration of resonator 42 in the same manner as alternator 16 of FIG. 1 responds to the z axis vibration of resonator 2.

Figure 7:
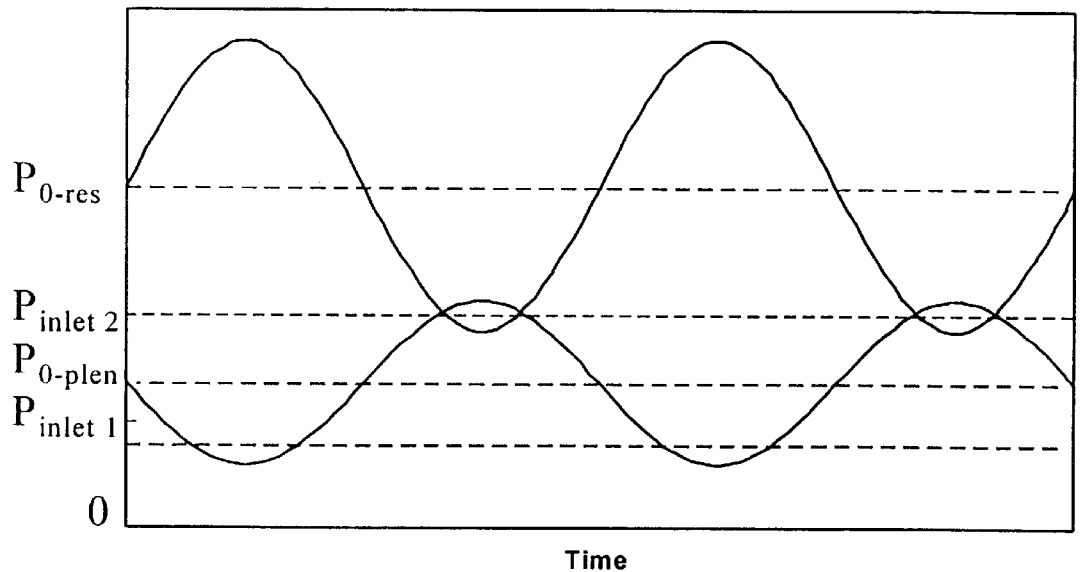
FIG. 7 is a graphical representation of the static and dynamic pressures associated with the induction compressors of FIG. 6.

FIG. 7 illustrates the dynamic and static pressure relationships of the various stages of compression. In operation, the pulse combustion driven standing wave is initiated by spark plug 43. Reactant flow proceeds through inlets 58 and 60 at the inlet pressure $P_{inlet-1}$ and through cowlings 56 where the reactants pick up heat from the wall of resonator 42 and experience some degree of flow mixing. The vibration of the entire generator assembly will excite the fundamental resonance of tuned plenums 50. The resulting dynamic pressure inside tuned plenums 50 will draw in the heated reactants from cowling 56 through valves 52 and into tuned plenums 50 thereby compressing the reactants to the average plenum pressure $P_{0-plenum}$. Inside tuned plenums 50 the reactants experience further mixing due to the initial turbulent valve flow and then due to the cyclic acoustic particle displacement.

The dynamic pressure inside plenums 50 will compress the reactants again from the average plenum pressure $P_{0-plenum}$ up to the plenum discharge pressure $P_{inlet-2}$ at which time the reactants are discharged from plenums 50 through the $2^{nd}$ stage valves 54 and into resonator 42. The overlap of the plenum's peak acoustic pressure and the minimum acoustic pressure of resonator 42 forces second stage valves 54 open once per cycle thereby discharging the heated and mixed reactants into resonator 42 for combustion. The passage of reactants through valves 54 induces further mixing. The result of this process as seen in FIG. 7 is an elevated average resonator pressure $P_{0-res}$ due to the pressure lift provided by induction compressors 48.

Additional induction compressors could be staged if desired to provide even higher $P_{0-res}$ values. Cowlings 56 also lend themselves to acoustical resonance and could provide additional dynamic pressure boost.

Consideration must be given to the acoustic design of resonant plenums 50. As shown in FIG. 7, the phase between the plenum's standing wave and the resonator's standing wave is essential to the compression process. The plenum's resonance is driven by two sources: the opening of $2^{nd}$ stage valves 54 and the vibratory motion of the entire plenum. The superposition of these two driving sources must be taken into account when designing the plenum geometry. If the plenum resonant frequency is to be equal to the resonator's, then the plenum design should ensure that the valves are the weaker source.

Many improvements on the embodiment of FIG. 6 will suggest themselves to those skilled in the art of tuned compressor or engine plenums and pulse combustors. For example, the plenums could be tuned to the resonator's $2^{nd}$ harmonic in which case the $2^{nd}$ stage valves could act as the sole driving source and the proper phases for induction ramming would be provided. Further, the ratio of $1^{st}$ and $2^{nd}$ stage valve areas can be used to increase $P_{0-plenum}$ and therefor $P_{0-res}$. Still further, if premixing of the reactants inside cowlings 56 is objectionable for safety reasons, then individual oxidizer and fuel cowlings can be used which would keep the reactants separated up to the induction compressors. Similarly, individual fuel and oxidizer lines could be wrapped in annular fashion around the exterior of resonator 42, thereby being placed in thermal contact with the hot resonator walls.

If a gaseous fuel supply pressure is high enough, then induction compressors 48 could be used to compress only the oxidizer and the fuel could be provided through a typical gas distributor within resonator 42.

As an alternative to PC, the standing acoustic waves of the present invention can be driven thermoacoustically. As described, current proposals for thermoacoustically driven electric generators require the coupling of a piston to an open end of the acoustic resonator and allowing the vibrating piston to drive a linear alternator. This piston would require a gas seal such as a diaphragm or bellows which raises issues of reliability. The dynamic forces produced by this system are limited by acoustic pressure amplitude and by the surface area of the piston.

Rather than being limited by a piston's surface area, the present invention utilizes the entire inner surface area of the resonator and so can generate very large dynamic forces. The use of RMS resonators further increases the desired dynamic forces by providing extremely high dynamic pressures.

Figure 8:
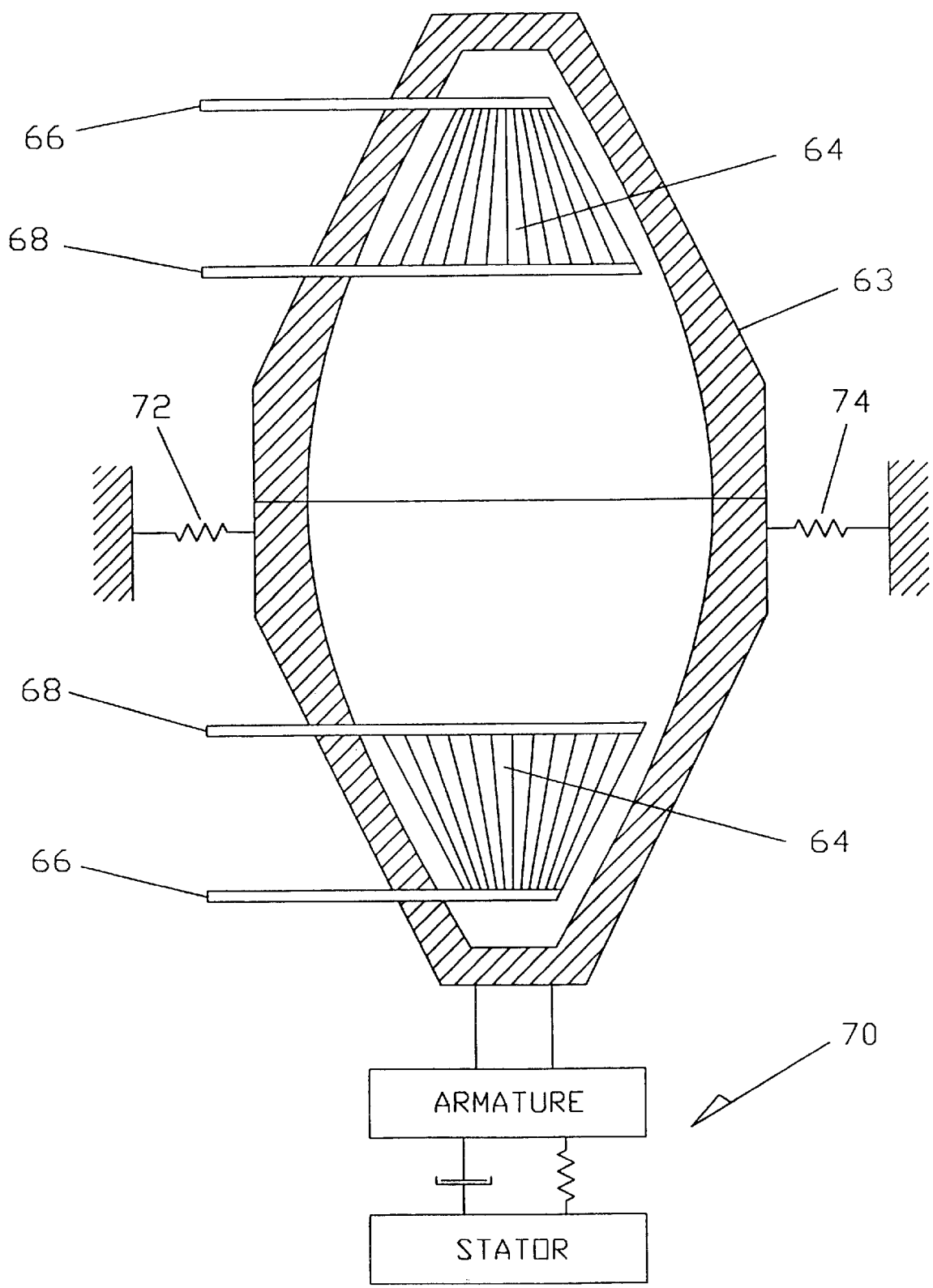
FIG. 8 is a sectional view of a thermoacoustically driven electric power generator in accordance with the present invention.

FIG. 8 illustrates a thermoacoustically-driven embodiment of the present invention. An explanation of thermoacoustic engine fundamentals can be found in G. W. Swift, "Thermoacoustic Engines," *J. Acoust. Soc. Am.* 84, 1169 (1988). In FIG. 8, a rigid walled resonator 63 having heat plate stacks 64 is operated in the prime mover mode as is well known in the art of thermoacoustic engines. Resonator 63 is resiliently mounted to the stationary surrounding environment by springs 72 and 74 thereby being unrestrained and free to vibrate along its cylindrical axis z. Heat is applied at heat exchangers 66 and extracted at heat exchangers 68 so as to provide a temperature gradient along the plate stack sufficient for driving the standing acoustic wave. Once the standing wave is established its oscillating pressure exerts dynamic forces against the walls of resonator 63 causing it to vibrate as a rigid body along z at the acoustic frequency in response to these dynamic forces. As before, a generator 70 is shown schematically which converts the z axis vibration of resonator 32 into electric power.

The art of thermoacoustic engines is well developed and will suggest many methods and techniques to one skilled in the art for implementing the embodiment of FIG. 8. For example, the use of two plate stacks is optional. In addition, plate stacks can be used with RMS resonators to achieve high pressure amplitudes for a desired waveform and with all of the advantages previously described. Further, heat sources used for the embodiment of FIG. 8 could include waste heat from a PC generator of the type described above, waste heat from other processes, direct combustion of fuels as well as solar energy to name a few.

While the above description contains many specifications, these should not be construed as limitations on the scope of the invention, but rather as an exemplification of preferred embodiments. Thus, the scope of the present invention is not limited to specific pulse combustor designs or thermoacoustic designs.

The present invention can be applied wherever electrical power is needed. Frequency locking the PC embodiments of the present invention to the local power grid frequency may be achieved for example with spark timing, the timing of actuated valves such as rotary valves or with variably-tuned resonator branches. In this way, the generated electric power could be linked to the local grid. The AC output from the alternator could be converted to other frequencies or to DC. PC generators could be used as the onboard power source for hybrid electric vehicles, including those that store energy in mechanical flywheels where gas turbines are currently used. The present invention can be sized for various power output requirements.

The PC literature provides a diversity of pulse combustor designs and enhancements including the use of gaseous or liquid fuels, fuel distributor heads, the number of valves used, valved and areovalved combustors, multiple combustors, fuel-oxidizer mixing, valve styles including flappers, Tesla valves, and rotary valves. Many of these concepts can be seen in the following publications: A. A. Putnam, F. E. Belles, and J. A. C. Kentfield, "Pulse Combustion," Prog. Energy Combust. Sci. 12, 43 (1986), J. C. Griffiths, E. J. Weber, "The Design of Pulse Combustion Burners," Research Bulletin 107, American Gas Association Laboratories (1969), P. S. Vishwanath, "Advancement of Developmental Technology for Pulse Combustion Applications," Gas Research Institute Report No. GRI-85/0280 (1985) the entire contents of which are all hereby incorporated by reference. The application of currently available PC design information to the present invention will suggest itself to those skilled in the art.

Accordingly, the scope of the invention should be determined not by the embodiments illustrated, but by the appended claims and their equivalents.

What is claimed is:

1. An energy conversion device comprising:
   a) an acoustic resonator,
   b) pulse combustion means for creating a standing wave within said resonator,
   c) an electric alternator,
   d) said alternator being coupled to said resonator so as to convert acoustically driven mechanical vibrations into electrical power.

2. An energy conversion device as recited in claim 1 wherein said pulse combustion means comprises at least one inlet for feeding reactants into said resonator, and an outlet for providing exhaust gas to escape from said resonator.

3. An energy conversion device as recited in claim 2 wherein said pulse combustion means further comprises a means for igniting said fuel.

4. An energy conversion device as recited in claim 3 wherein said means for igniting comprises an ignition device to provide a spark to a region within said resonator, said region containing said fuel.

5. An energy conversion device as recited in claim 1, further comprising a piston coupled to said resonator, said piston driven for mechanical movement by dynamic pressure of said standing wave, said piston coupled to said alternator.

6. An energy conversion device as recited in claim 1 wherein said alternator is attached to said resonator and movement of said resonator causes movement of at least a part of said alternator.

7. An energy conversion device as recited in claim 6 wherein said alternator comprises an armature and a stator, wherein said at least one part comprises said armature mounted for relative movement with respect to said stator.

8. An energy conversion device as recited in claim 7 wherein said armature is rigidly connected to said resonator and said armature is resiliently connected to said stator.

9. An energy conversion device as recited in claim 8 wherein said resonator has a cylindrical axis and said resonator is supported for permitting facile movement along the cylindrical axis of said resonator.

10. An energy conversion device as recited in claim 7 wherein said armature is resiliently connected to said resonator and said armature is resiliently connected to said stator.

11. An energy conversion device as recited in claim 1 wherein said resonator has a cylindrical axis and said resonator is supported for permitting facile movement along the cylindrical axis of said resonator, whereby said entire resonator oscillates in response to standing waves created by said pulse combustion means.

12. An energy conversion device as recited in claim 2 further comprising a conduit positioned in thermal contact with said acoustic resonator, at least one constituent of said reactants passing through said conduit for pre-heating said at least one constituent prior to feeding said at least one constituent into said acoustic resonator.

13. An energy conversion device as recited in claim 2 further comprising a resonant plenum mounted to said acoustic resonator for pre-compressing at least one constituent of said reactants prior to feeding said at least one constituent into said acoustic resonator.

14. An energy conversion device as recited in claim 12 further comprising a resonant plenum mounted to said acoustic resonator for pre-compressing at least one constituent of said reactants prior to feeding said at least one constituent into said acoustic resonator.

15. An energy conversion device as recited in claim 12 wherein said resonator has a cylindrical axis and said resonator is supported for permitting facile movement along the cylindrical axis of said resonator, whereby said entire resonator oscillates in response to standing waves created by said pulse combustion means.

16. An energy conversion device as recited in claim 13 wherein said resonator has a cylindrical axis and said resonator is supported for permitting facile movement along the cylindrical axis of said resonator, whereby said entire resonator oscillates in response to standing waves created by said pulse combustion means.

17. An energy conversion device as recited in claim 16 wherein said resonant plenum is configured to have approximately the same resonant frequency as said acoustic resonator.

18. An energy conversion device as recited in claim 2 wherein said exhaust gases are coupled to a device to perform useful work.

19. An energy conversion device as recited in claim 2 wherein said exhaust gases are thermally coupled to a thermoacoustic energy conversion device, said thermoacoustic energy conversion device comprising:
   (a) an acoustic resonator,
   (b) thermoacoustic means for creating a standing wave within said resonator, said thermoacoustic means including a heat exchanger thermally coupled to receive heat from said exhaust gases,
   (c) an electric alternator, and
   (d) said alternator being attached to said resonator so as to convert acoustically driven mechanical vibrations of said resonator into electrical power.

20. An energy conversion device as recited in claim 2 further comprising:
   a) a resonant plenum mounted to said resonator,
   b) said at least one inlet communicating between said resonant plenum and said resonator,
   c) a resonant plenum inlet for feeding at least one constituent of said reactants into said resonant plenum,
   d) said resonant plenum having a standing wave therein whereby said at least one constituent of said reactants is acoustically compressed prior to entering said resonator.

21. An energy conversion device as recited in claim 2 further comprising:
   a) a conduit positioned in thermal contact with said acoustic resonator, at least one of first and second constituents of said reactants passing through said conduit for pre-heating said at least one of said first and second constituents prior to feeding said at least one of said first and second constituents into said acoustic resonator,
   b) a resonant plenum mounted to said resonator,
   c) said at least one inlet communicating between said resonant plenum and said resonator,
   d) a resonant plenum inlet for feeding at least one of said first and second constituents into said resonant plenum,
   e) said resonant plenum having a standing wave therein whereby said at least one of said first and second constituents fed into said resonant plenum is acoustically compressed prior to entering said resonator.

22. An energy conversion device comprising:
   a) an acoustic resonator,
   b) means for creating a standing wave within said resonator, said means for creating including means for introducing and igniting reactants within said resonator to produce pulse combustion,
   c) said resonator having a cylindrical axis and mounted for vibratory movement along said cylindrical axis, wherein said standing waves from said pulse combustion drive the vibratory movement of said resonator,
   d) an electric alternator having an armature and a stator, said armature and stator mounted for relative movement with respect to one another, and
   e) said armature being attached to said resonator so as to convert acoustically driven mechanical vibrations of said resonator into movement of said armature and thus into electrical power.

23. An energy conversion device comprising:
   a) an acoustic resonator,
   b) thermoacoustic means for creating a standing wave within said resonator,
   c) an electric alternator,
   d) said alternator being attached to said resonator so as to convert acoustically driven mechanical vibrations of said resonator into electrical power, and
   e) wherein said resonator has a cylindrical axis and said resonator is supported for permitting facile movement along the cylindrical axis of said resonator, whereby said entire resonator oscillates in response to standing waves created by said thermoacoustic means.

24. An energy conversion device as recited in claim 23 wherein said alternator comprises an armature and a stator, said armature mounted for relative movement with respect to said stator.

25. An energy conversion device as recited in claim 24 wherein said armature is rigidly connected to said resonator and said armature is resiliently connected to said stator.

26. An energy conversion device as recited in claim 24 wherein said armature is resiliently connected to said resonator and said armature is resiliently connected to said stator.

27. An energy conversion device comprising:
   a) an acoustic resonator,
   b) thermoacoustic means for creating a standing wave within said resonator,
   c) said resonator having a cylindrical axis and mounted for vibratory movement along said cylindrical axis, wherein said standing waves drive the vibratory movement of said resonator,
   d) an electric alternator having an armature and a stator, said armature and stator mounted for relative movement with respect to one another, and
   e) said armature being attached to said resonator so as to convert acoustically driven mechanical vibrations of said resonator into movement of said armature and thus into electrical power.

28. An energy conversion device comprising:
   a) an acoustic resonator,
   b) one of (1) pulse combustion means and (2) thermoacoustic means for creating a standing wave within said resonator,
   c) an electric alternator,
   d) said alternator being coupled to said resonator so as to convert acoustically driven mechanical vibrations into electrical power
   e) said resonator having a chamber containing a fluid, said chamber being driven at a resonant mode and having means, including at least an internal wall configuration of said chamber, which provide the harmonic phases and amplitudes such as to synthesize a non-sinusoidal, unshocked waveform.

29. An energy conversion device comprising:
   a) an acoustic resonator having a cylindrical axis defined as a z axis and a radius r being defined as the perpendicular distance from an inner surface of said resonator to said z axis,
   b) one of (1) pulse combustion means and (2) thermoacoustic means for creating a standing wave within said resonator,
   c) an electric alternator,
   d) said alternator being coupled to said resonator so as to convert acoustically driven mechanical vibrations into electrical power,
   e) said resonator having an interior shape such that $dr/dz$ is zero near a pressure node of the peak pressure distribution along said z axis.

* * * * *